(12) United States Patent
Shiraishi et al.

(10) Patent No.: US 8,662,509 B2
(45) Date of Patent: Mar. 4, 2014

(54) SHOCK ABSORBING DEVICE FOR RACK AND PINION TYPE STEERING MECHANISM

(75) Inventors: Takehito Shiraishi, Saitama (JP); Yasuo Shimizu, Saitama (JP); Takahiro Aoki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/513,924

(22) PCT Filed: Sep. 24, 2010

(86) PCT No.: PCT/JP2010/005769
§ 371 (c)(1), (2), (4) Date: Jun. 5, 2012

(87) PCT Pub. No.: WO2011/077614
PCT Pub. Date: Jun. 30, 2011

(65) Prior Publication Data
US 2012/0242054 A1    Sep. 27, 2012

(30) Foreign Application Priority Data

Dec. 24, 2009 (JP) ................................. 2009-293121

(51) Int. Cl.
*B62D 3/12* (2006.01)
*F16F 7/12* (2006.01)

(52) U.S. Cl.
USPC ....... 280/93.514; 180/444; 267/293; 267/141

(58) Field of Classification Search
USPC ............. 280/93.514; 180/427, 428, 444, 400; 267/293, 141, 153, 292, 219, 220, 33, 267/35; 92/85 R
See application file for complete search history.

(56) References Cited

U.S. PATENT DOCUMENTS

| | | | |
|---|---|---|---|
| 3,037,764 A * | 6/1962 | Paulsen ........................ | 267/292 |
| 6,523,431 B2 | 2/2003 | Ozsoylu et al. | |
| 6,837,143 B2 | 1/2005 | Inoue | |
| 7,275,618 B2 | 10/2007 | Abe et al. | |

FOREIGN PATENT DOCUMENTS

| | | |
|---|---|---|
| JP | S60-32110 U | 3/1985 |
| JP | 8-133102 A | 5/1996 |
| JP | 2003-511294 A | 3/2003 |
| JP | 2003-312491 A | 11/2003 |

(Continued)

OTHER PUBLICATIONS

JP Office Action drafted Nov. 13, 2013 in corresponding JP patent application, with English translation thereof.

*Primary Examiner* — Keith Frisby
(74) *Attorney, Agent, or Firm* — Carrier Blackman & Associates, P.C.; William D. Blackman; Joseph P. Carrier (57) ABSTRACT

A shock absorbing device for a rack and pinion type steering device includes a rack shaft, a rack housing, a stopper portion formed in an end part of the rack shaft, a stopper engaging portion provided on the rack housing to define a stroke end position for the rack shaft by engaging the stopper portion, a stepped portion formed on the rack shaft, a shoulder portion formed in an enlarged diameter portion of the rack housing, and a cylindrical elastic member fitted on the rack shaft such that the elastic member is pressed in the axial direction of the rack shaft by the stepped portion and the shoulder portion. The elastic member is formed with grooves on each of an outer circumferential surface and an inner circumferential surface thereof. Such shock absorbing device for a rack and pinion type steering device has a high shock absorbing capability.

6 Claims, 7 Drawing Sheets

(56) References Cited

FOREIGN PATENT DOCUMENTS

| JP | 2003-335247 A | | 11/2003 | |
| JP | 2004-232714 A | | 8/2004 | |
| JP | 2005-161942 A | | 6/2005 | |
| JP | 2009-012663 | * | 1/2009 | ............... B62D 3/12 |
| JP | 2009-012663 A | | 1/2009 | |

* cited by examiner

SHOCK ABSORBING DEVICE FOR RACK AND PINION TYPE STEERING MECHANISM

TECHNICAL FIELD

The present invention relates to a shock absorbing device for a rack and pinion type steering device, and in particular to a technology for absorbing the impact that is caused when a rack shaft is brought to a stop at a stroke end position thereof.

BACKGROUND OF THE INVENTION

The automotive rack and pinion type steering device includes a pinion and a rack shaft meshing with the pinion such that the rotational movement of the steering wheel caused by a vehicle operator is converted into a linear movement of the rack shaft in the lateral direction of the vehicle body, and the steering angle of the road wheels is varied in a corresponding manner. The terminal end position of the rack shaft movement or the stroke end position is defined by the abutting of a rack end portion provided at the terminal end of the rack shaft with a rack housing that supports the rack shaft. To minimize the noise caused by the collision between the rack end portion and the rack shaft, a cushioning member is typically interposed between the rack end portion and the rack housing. The cushioning member may consist of a cylindrical elastic member fitted around the rack shaft so as to be compressed between the rack end portion and the rack housing. See Patent Document 1, for instance.

PRIOR ART DOCUMENT(S)

Patent Document(S)

Patent Document 1: JP 08-133102A

SUMMARY OF THE INVENTION

Task to be Accomplished by the Present Invention

The shock absorbing capability of an elastic member such as that disclosed in Patent Document 1 can be increased by increasing the spring constant of the elastic member, for instance, by increasing the cross sectional area of the elastic member, and/or by increasing the deformation stroke of the elastic member, for instance, by extending the axial length of the elastic member. However, the cross sectional area of the elastic member is limited by the size of the rack housing so that any significant increase of the cross sectional area is not possible. When the axial length of the elastic member is increased, the elastic member is prone to buckling when a compressive load is applied to the elastic member in the axial direction thereof (or the elastic member is caused to deflect radially outward), and it may prevent the elastic member from providing the desired shock absorbing capability.

The present invention was made in view of such problems of the prior art, and has a primary object to provide a shock absorbing device for a rack and pinion type steering device that has a high shock absorbing capability.

Means to Accomplish the Task

To accomplish such an object, the present invention provides a shock absorbing device (1) for a rack and pinion type steering device (10), comprising: a rack shaft (11) for a rack and pinion type steering device; a rack housing (10) supporting the rack shaft so as to be moveable in an axial direction thereof; a stopper portion (20) formed in an end part of the rack shaft; a stopper engaging portion (40) provided on the rack housing to define a stroke end position for the rack shaft by engaging the stopper portion; a first pressing part (19) formed on the rack shaft; a second pressing part (42) formed on the rack housing; and a cylindrical elastic member (30) fitted on the rack shaft such that the elastic member is pressed in the axial direction of the rack shaft by the first pressing part and the second pressing part as the stopper portion approaches the stopper engaging portion; wherein the elastic member is formed with a groove (31, 32) on each of an outer circumferential surface (30A) and an inner circumferential surface (30B) thereof.

According to this arrangement, when a load is applied to the elastic member in the axial direction of the rack shaft, the part of the elastic member adjacent to each groove is caused to undergo a bending deformation so as to fill the groove before undergoing a compressive deformation. As a result, the deformation stroke by which the elastic member is allowed to deform without incurring the buckling of the elastic member (caused by the compressive deformation thereof) is increased, and this amounts to increasing the amount of the energy that can be absorbed by the elastic member. In other words, the shock absorbing capability of the elastic member can be increased while the tendency thereof to buckle is controlled.

According to a certain aspect of the present invention, the elastic member is formed with a plurality of grooves on each of an outer circumferential surface and an inner circumferential surface thereof such that the grooves on the outer and inner circumferential surfaces alternate each other along an axial direction of the elastic member.

According to this arrangement, the directions of the bending deformation at the grooves of the elastic member alternates from one direction to another along the axial direction of the elastic member so that the elastic member is prevented from bending only in one direction in a pronounced way.

According to another aspect of the present invention, the grooves extend spirally and continuously around an axial line of the elastic member.

According to this arrangement, when forming the elastic member formed with circumferential grooves by injection molding, the removal of the elastic member from the molding die can be facilitated.

According to yet another aspect of the present invention, the rack housing comprises a tubular member having an open end, and an enlarged diameter portion (41) is formed on an inner circumferential surface of the rack housing at the open end thereof, the elastic member being positioned within the enlarged diameter portion when the stopper approaches the stopper engaging portion.

Thereby, when the elastic member is subjected to a load in the direction of the axial line of the rack shaft, the elastic member is prevented from deforming radially or buckling by the rack shaft and the enlarged diameter portion.

Effect of the Invention

Owing to the structure characterized above, the shock absorbing capability of a shock absorbing device for a rack and pinion type steering device can be improved.

DETAILED DESCRIPTION OF THE PREFERRED EMBODIMENT(S)

Now a shock absorbing device for a rack and pinion type steering device embodying the present invention is described in the following in more detail in terms of a concrete embodiment with reference to the appended drawings. The shock absorbing device 1 according to the present invention is provided in a rack and pinion type steering device 10, and absorbs (buffers) the shock that is caused as a rack shaft 11 reaches a stroke end position. In the following description, the normal traveling direction of the vehicle is referred to as front or forward, and the right and left are defined as seen by a vehicle occupant facing forward. The plumb vertical direction is referred to as vertical direction.

<Outline of the Rack and Pinion Type Steering Device>

Figure 1:
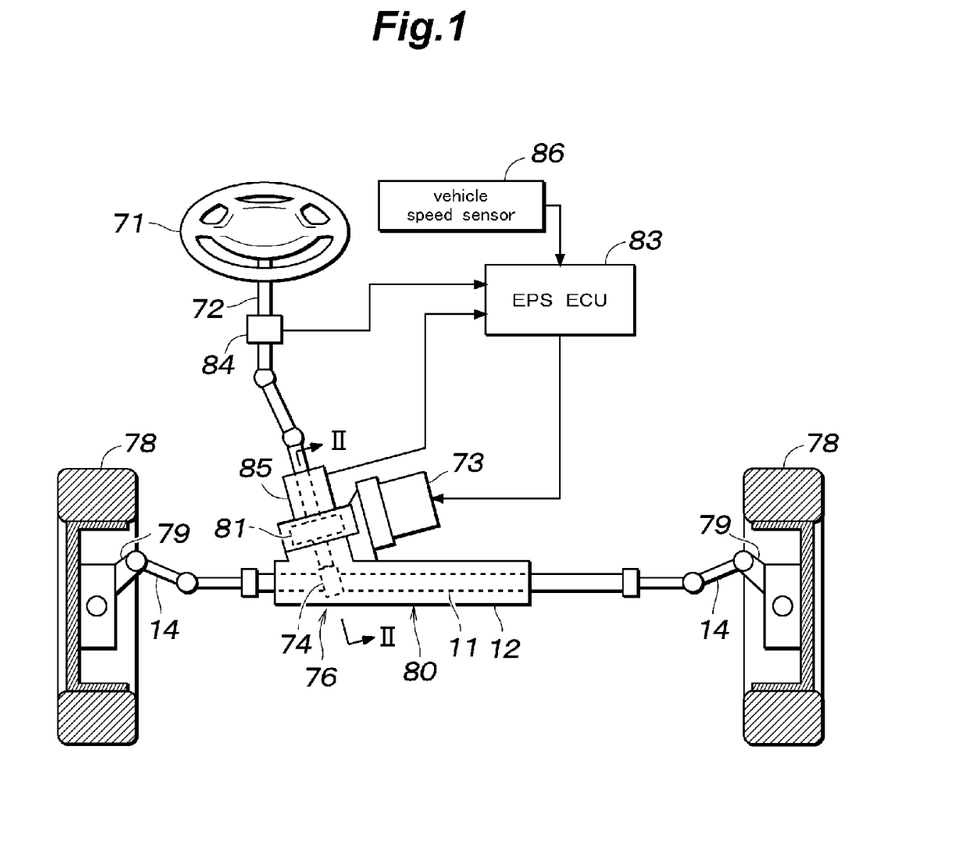
FIG. 1 is a schematic diagram of a rack and pinion type steering device.

As shown in FIG. 1, the rack and pinion type steering device 10 includes a rack-and-pinion mechanism 76 that essentially consists of a pinion 74 integrally connected to a steering wheel 71 via a steering shaft 72 in a rotationally fast manner and a rack shaft 11 meshing with the pinion 74 and disposed to be moveable in the lateral direction of the vehicle body. The rack shaft 11 is supported by a rack housing 12, and is connected to a knuckle 79 of a corresponding front wheel 78 at each end thereof via a tie rod 14 so that the front wheels 78 are steered according to the manual angular movement of the steering wheel 71. The drive force of an electric motor 73 can be applied to the steering shaft 72 via a worm gear mechanism 81 received in a gear box 80 along with the pinion 74.

Figure 2:
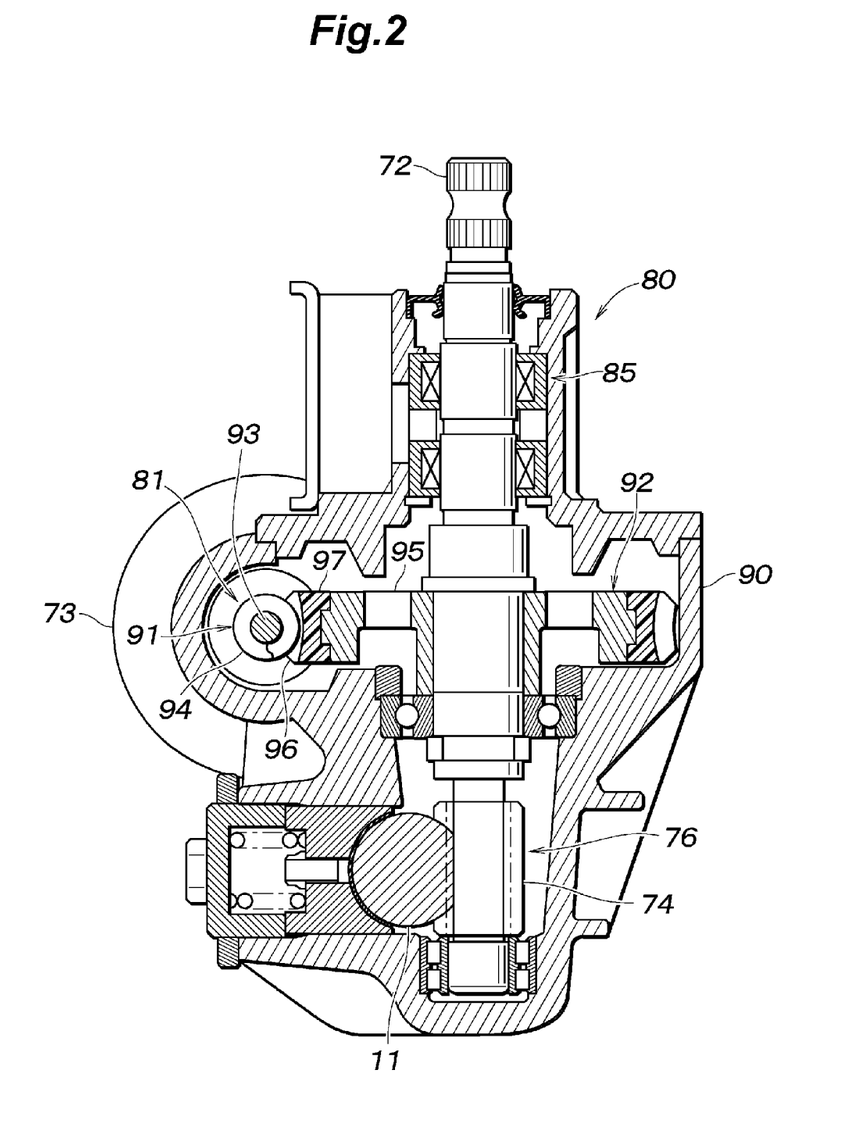
FIG. 2 is a sectional view taken along line II-II of FIG. 1.

The electric motor 73 is controlled by a steering control unit (EPS ECU) 83. The steering control unit 83 receives output signals of a steering angle sensor 84 for detecting the steering angle of the steering wheel 71, a steering torque sensor 85 for detecting the manual steering torque applied to the pinion 74 and a vehicle speed sensor 86 for detecting the traveling speed of the vehicle, and controls the electric motor 73 so as to produce a prescribed steering assist force according to these output signals FIG. 2 is a sectional view of the gear box 80 taken along line II-II of FIG. 1. This gear box 80 includes a gear box housing 90 that receives a worm gear mechanism 81 for transmitting the drive force of the electric motor 73 to the steering shaft 72 at a reduced speed and a rack and pinion mechanism 76 for converting the rotational movement of the steering shaft 72 to the linear movement of the rack shaft 11, in addition to the steering torque sensor 85 for detecting the steering torque that is applied to the steering shaft 72.

The worm gear mechanism 81 includes a worm 91 coaxially connected to the output shaft of the electric motor 73 and a worm wheel 92 coaxially and integrally fitted on the steering shaft 72 such that the drive force of the electric motor 73 which is applied to the worm 91 serving as a drive gear causes the worm wheel 92 serving as a driven gear to turn.

The worm 91 includes a core 93 and a single thread tooth 94 projecting from the outer circumferential surface of the core 93, and is made of metallic material such as carbon steel. By using a single thread tooth 94, a large speed reduction can be achieved by the factor of the number of the teeth on the worm wheel 92 so that a relatively large torque can be produced by using an electric motor 73 having a relatively small torque output.

The worm wheel 92 includes a core part 95 connected to the steering shaft 72 and a teeth forming part 97 surrounding the periphery of the core part 95 and formed with teeth 96 on the outer periphery thereof. The core member 95 is made of metallic material, and the teeth forming part 97 is made of plastic material such as polyamide resin. The teeth forming part 97 may be integrally attached to the core part 95 by an insert molding process.

<Structure of a Shock Absorbing Device>

Figure 3:
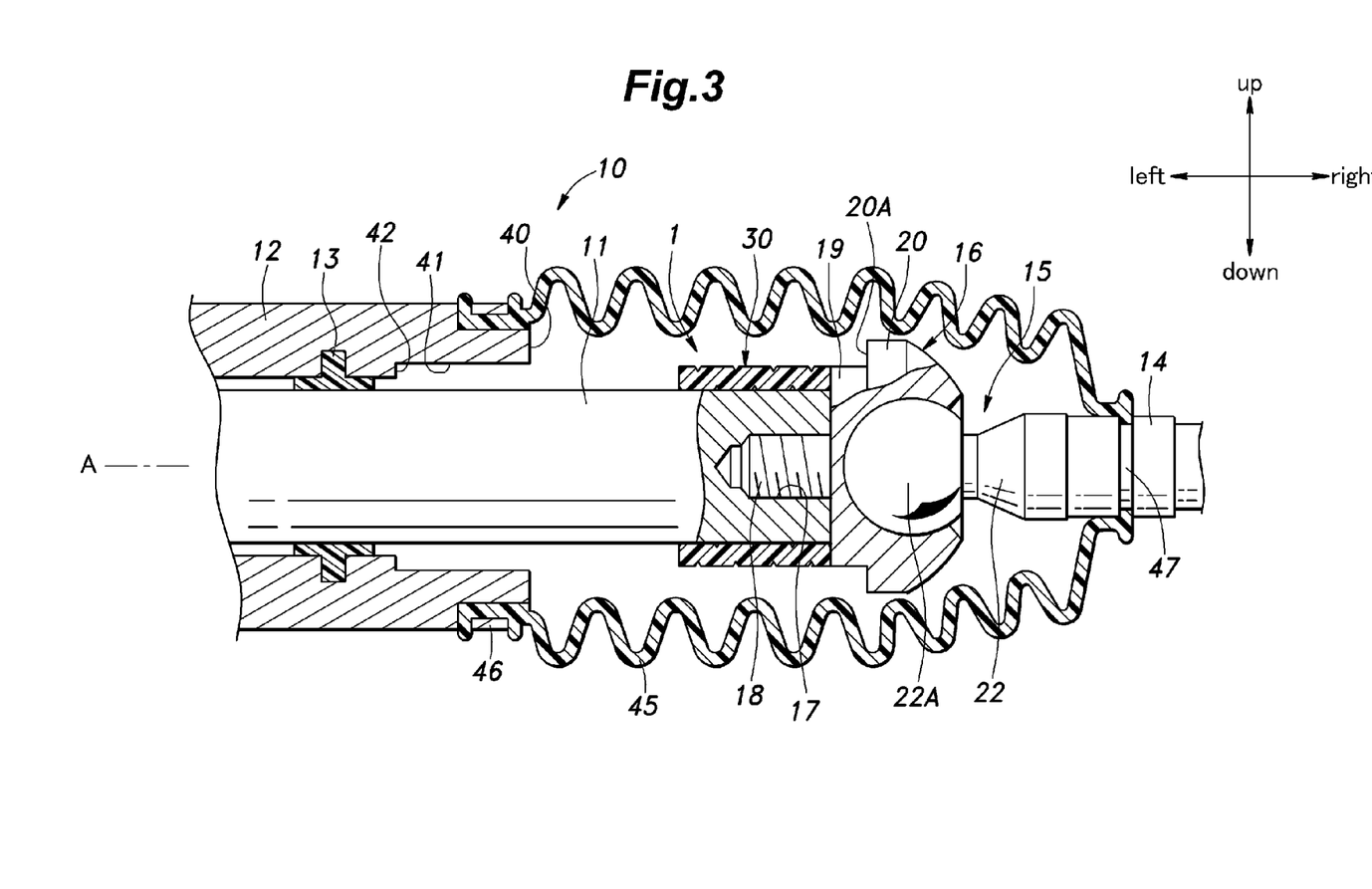
FIG. 3 is a fragmentary sectional view of a shock absorbing device embodying the present invention.

FIG. 3 shows the right end of the rack and pinion type steering device 10 extending in the lateral direction of the vehicle body. The rack shaft 11 is provided with a circular cross section, and is supported inside the cylindrical rack housing 12 via an annular bush 13 so as to be slidable in the axial direction A of the rack shaft 11. The rack housing 12 is attached to the vehicle body (not shown in the drawings) so as to extend in the lateral direction of the vehicle body. Therefore, the rack shaft 11 extends in the lateral direction of the vehicle body, and is slidable in the lateral direction of the vehicle body. The rack shaft 11 is formed with rack teeth (not shown in the drawings) in a laterally middle part thereof. The rack teeth are arranged along the axial direction A, and meshes with the pinion 74.

The end part of the rack shaft 11 is fitted with a ball joint housing 16 for a ball joint 15 that couples the tie rod 14 with the rack shaft 11. The end surface of the rack shaft 11 is formed with a hole defining a female thread 17, and a male thread 18 is formed on a part projecting from the ball joint housing 16. The ball joint housing 16 is fixedly attached to the end part of the rack shaft 11 by threading the female thread 17 and the male thread 18 with each other. The ball joint housing 16 is radially wider than the rack shaft 11. More specifically, the ball joint housing 16 includes an annular stepped portion (first pressing part) 19 that protrudes radially is formed around the circumference of the rack shaft 11 at the part where the rack shaft 11 is joined to the ball joint housing 16.

The part of the ball joint housing 16 more laterally outward than the stepped portion 19 is provided with a stopper portion 20 that extends radially more outward than the stepped portion 19. The laterally inward end of the stopper portion 20 is formed with a stopper surface 20A extending perpendicular to the axial line A.

The ball joint housing 16 receives therein a ball-shaped head 22A of a ball stud 22 in a freely rotatable manner. The stem part of the ball stud 22 is connected to an end of the tie rod 14. The other end of the tie rod 14 is connected to a knuckle 79 supporting the front wheel in such a manner that the steering angle of the wheel may be varied depending on the movement of the rack shaft 11.

Figure 4:
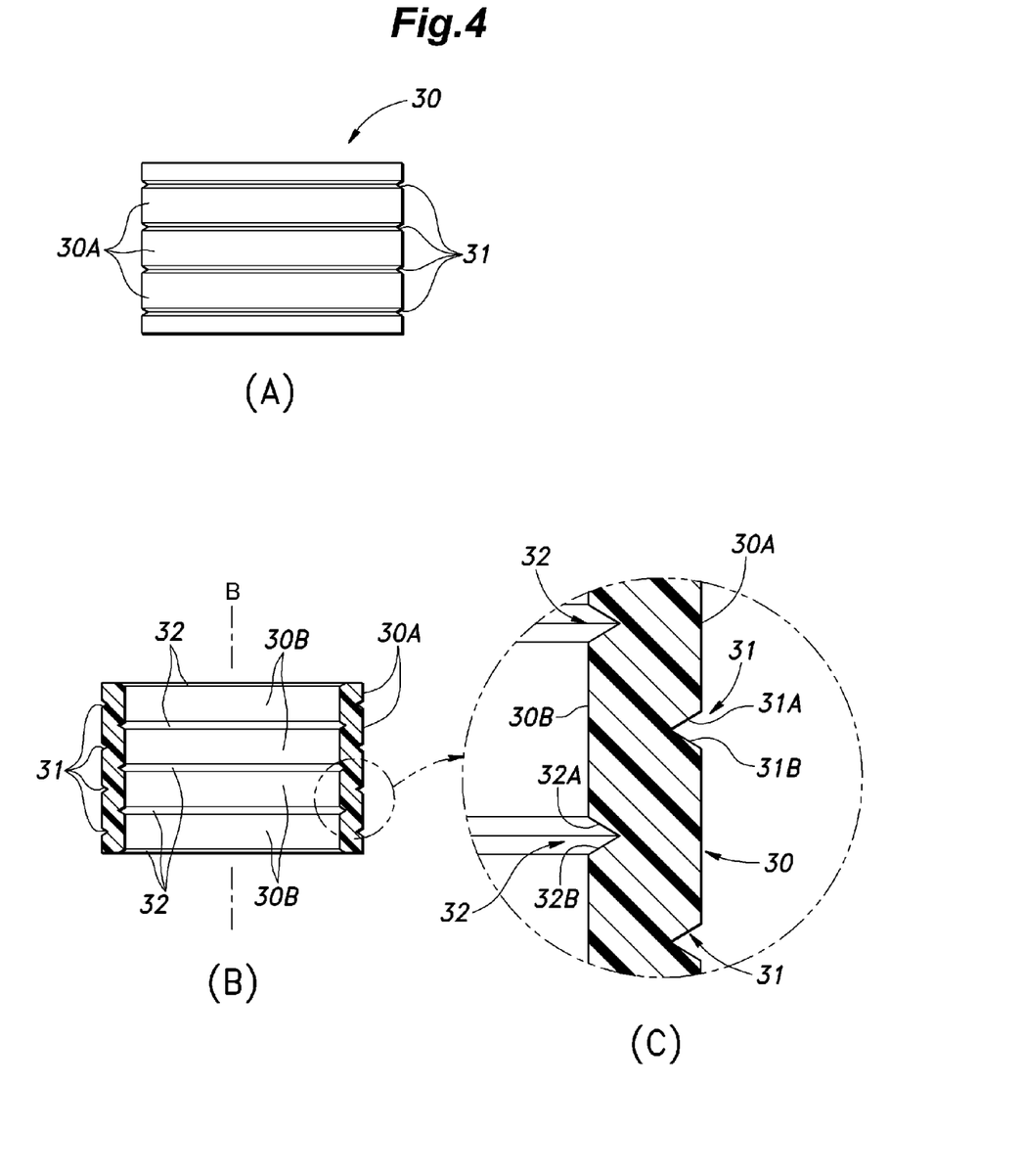
FIGS. 4A, 4B and 4C are a side view, a sectional view and an enlarged sectional view of an elastic member of the shock absorbing device.

A cylindrical elastic member 30 made of elastically deformable plastic material is fitted on the outer circumferential surface of the rack shaft 11. The inner diameter of the elastic member 30 is substantially identical to the outer diameter of the rack shaft 11 so that the inner circumferential surface 30B (See FIG. 4) of the elastic member 30 slidably engages the outer circumferential surface of the rack shaft 11. The laterally outer end surface of the elastic member 30 (on the right hand side of the drawing) abuts the stepped portion 19 of the ball joint housing 16.

As shown in FIG. 4A, the outer circumferential surface 30A of the elastic member 30 is formed with four annular outer circumferential grooves 31 arranged at a regular interval. As shown in FIG. 4B, the inner circumferential surface 30B of the elastic member 30 is formed with five annular inner circumferential grooves 32 at a regular interval. The outer circumferential grooves 31 and the inner circumferential grooves 32 are arranged so as to alternate with each other in the axial direction B of the elastic member 30. The numbers of the outer circumferential grooves 31 and the inner circumferential grooves 32 are not limited by those of the illustrated embodiment, but may be increased or decreased without departing from the spirit of the present invention.

As shown in FIG. 4C in an enlarged scale, the cross section of each of the outer circumferential grooves 31 and the inner circumferential grooves 32 is triangular. The cross section of each outer circumferential groove 31 is defined by a pair of slanted surfaces 31A and 31B extending radially from a bottom end where they form a corner to the outer circumferential surface 30A. Similarly, the cross section of each inner circumferential groove 32 is defined by a pair of slanted surfaces 32A and 32B extending radially from a bottom end where they form a corner to the inner circumferential surface 30B. The cross section of each of the outer circumferential grooves 31 and the inner circumferential grooves 32 is not limited to the triangular shape, but may also be any other shape such as a circular shape.

The laterally outward end (right end) of the rack housing 12 is formed with a stopper engaging portion 40 defined by a surface perpendicular to the axial line of the rack shaft 11. The inner circumferential surface of the rack housing 12 at the end part thereof is formed with an enlarged diameter portion 41 which extends through the right end surface of the rack housing 12 at the laterally outward end part thereof and is provided with a shoulder portion (second pressing part) 42 defined by a surface perpendicular to the axial line A of the rack shaft 11. The inner diameter of the enlarged diameter portion 41 is greater than the outer diameter of the resilient member 30 and the outer diameter of the stepped portion 19 so that the resilient member 30 and the stepped portion 19 can fit into the enlarged diameter portion 41.

A rack boot 45 is connected between the end part of the rack housing 12 and the tie rod 14. The rack boot 45 consists of a bellows member that can extend and compress by undergoing a bending deformation, and has a first end secured to the outer periphery of the rack housing 12 by a hose band 46 and a second end fixedly fitted into a groove 47 formed in the tie rod 14.

As described above, the shock absorbing device 1 comprises the rack shaft 11, the rack housing 12, the ball joint housing 16 and the elastic member 30.

<Mode of Operation of the Shock Absorbing Device>

Figure 5:
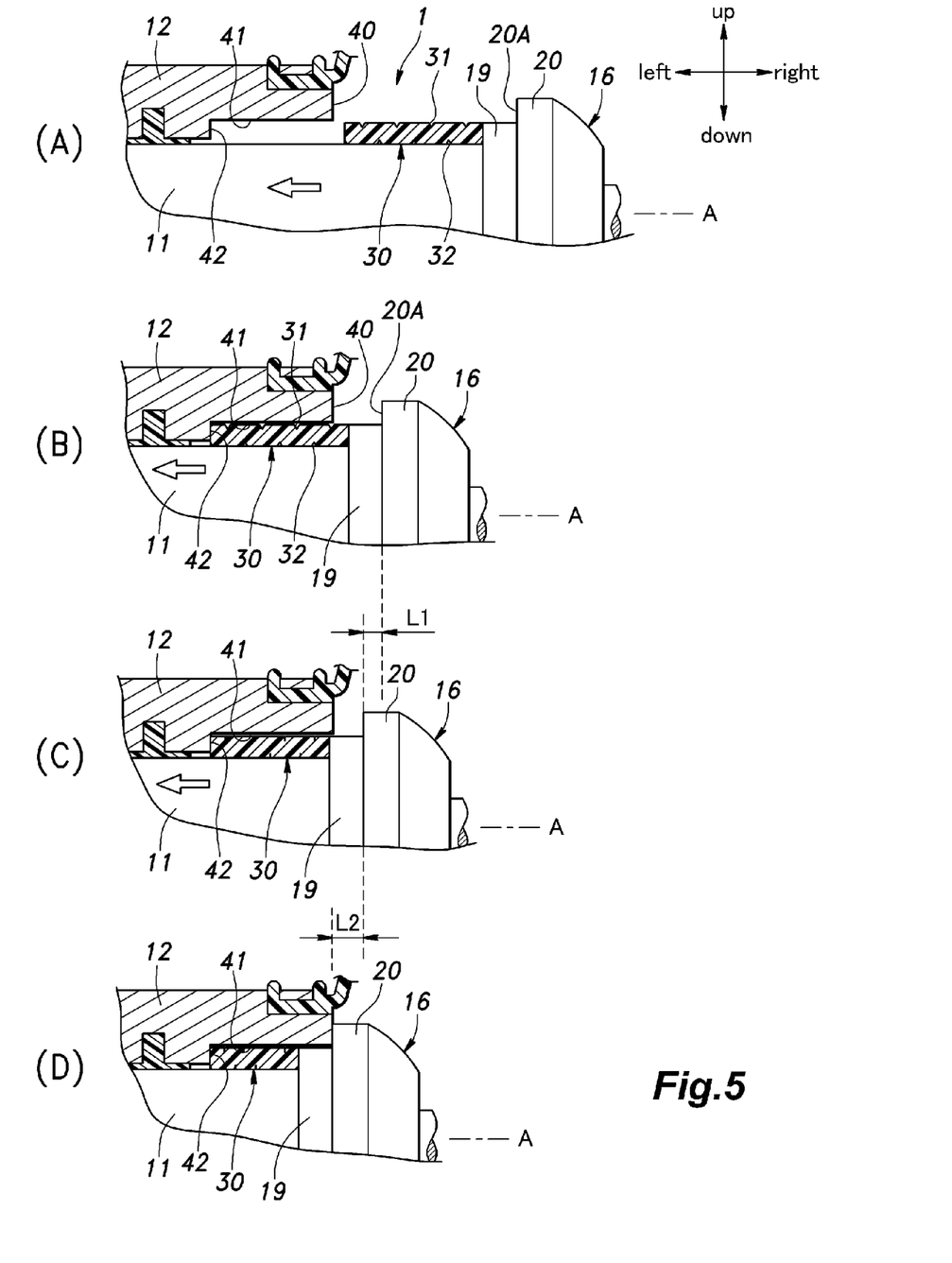
FIGS. 5A to 5D are views showing the mode of operation of the shock absorbing device.

Referring to FIG. 5, the mode of operation of the shock absorbing device 1 when the rack shaft 11 reaches the stroke end position thereof is described in the following. In FIG. 5, only the upper half of the shock absorbing device 1 is shown in an enlarged scale for the convenience of illustration. The stroke end position of the rack shaft 11 is defined by the abutting of the stopper surface 20A of the stopper portion 20 onto the stopper engaging portion 40 of the rack housing 12.

As shown in FIG. 5A, when the rack shaft 11 is substantially spaced away from the stroke end position, the elastic member 30 is located outside of the enlarged diameter portion 41, and the laterally outward end portion (right end) thereof abuts the stepped portion 19. As the rack shaft 11 moves leftward (in the direction of the white arrow in FIG. 5A), the elastic member 30 moves with the rack shaft 11, and is eventually received in the enlarged diameter portion 41. Thereafter, the laterally inward end portion (left end) of the elastic member 30 engages the shoulder portion 42 of the enlarged diameter portion 41 (See FIG. 5B).

As the rack shaft 11 moves further leftward from the position illustrated in FIG. 5B, the elastic member 30 is compressed between the stepped portion 19 and the shoulder portion 42 from two sides in the axial direction. As a result, the elastic member 30 bends at the parts where the outer circumferential grooves 31 and the inner circumferential grooves 32 are formed. More specifically, near each outer circumferential groove 31, the bending deformation occurs such that the slanted surfaces 31A and 31B of the outer circumferential groove 31 are brought into contact with each other, and the outer circumferential groove 31 is filled by the material of the elastic member 30. Likewise, near each inner circumferential groove 32, the bending deformation occurs such that the slanted surfaces 32A and 32B of the inner circumferential groove 32 are brought into contact with each other, and the inner circumferential groove 32 is filled by the material of the elastic member 30. During the time the elastic member 30 is bent from the state illustrated in FIG. 5B until all of the outer circumferential grooves 31 and the inner circumferential grooves 32 are filled up (See FIG. 5C), the rack shaft 11 moves by a distance L1 in the direction of the axial line A. In other words, owing to the bending of the elastic member 30 such that the outer circumferential grooves 31 and the inner circumferential groove 32 are filled up, the elastic member 30 shrinks or contracts by the length of L1 in the direction of the axial line A. When the state illustrated in FIG. 5C is reached, the laterally inward end (left end) of the stepped portion 19 is received within the enlarged diameter portion 41.

As the rack shaft 11 moves leftward from the state illustrated in FIG. 5C, the elastic member 30 is compressed between the stepped portion 19 and the shoulder portion 42 from two sides in the direction of the axial line A. This compressive deformation continues until the stopper surface 20A of the stopper portion 20 is engaged by the stopper engaging portion 40 of the rack housing 12 or until the rack shaft 11 finally reaches the stroke end position. By this time, the elastic member 30 is compressed by a distance L2 in the direction of the axial line A.

As discussed above, by the time the stopper portion 20 is engaged by the stopper engaging portion 40, the elastic member 30 has bent by the distance of L1 and then has compressed further by the distance of L2, and the impact energy of the rack shaft 11 in reaching the stroke end position has been absorbed by the elastic member 30 by a corresponding amount. Because the elastic member 30 is formed with the outer circumferential grooves 31 and the inner circumferential grooves 32 so that the elastic member 30 may be able to readily undergo a bending deformation, the deformation stroke of the elastic member 30 can be increased by the distance of L1, and the amount of the absorbed energy can be increased.

Figure 6:
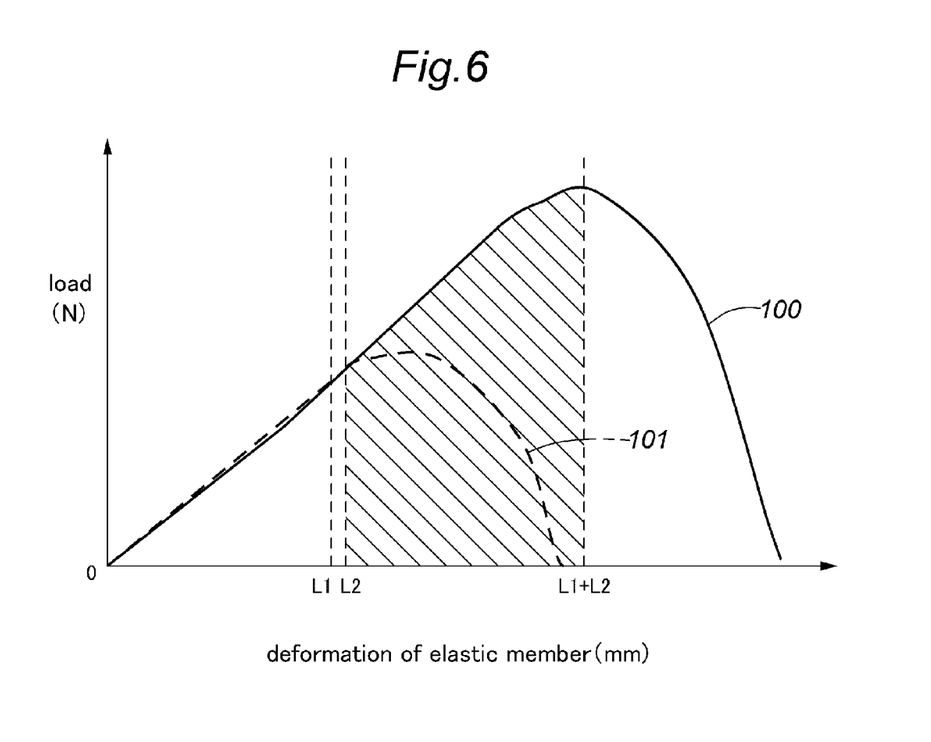
FIG. 6 is a graph showing the changes in the spring constant of the elastic member of the shock absorbing device.

FIG. 6 compares the spring constant (represented by a curve 100 in the drawing) of the elastic member 30 of the illustrated embodiment with the spring constant (represented by a curve 101 in the drawing) of a conventional elastic member for comparison. The conventional elastic member for comparison differs from the elastic member 30 of the illustrated embodiment in the absence of the outer circumferential grooves 31 and the inner circumferential grooves 32, but the two elastic members are otherwise identical to each other in such respects as the material and the shape. As shown by the curve 100, the elastic member 30 of the illustrated embodiment bends at the outer circumferential grooves 31 and the inner circumferential grooves 32 when the deformation in the direction of the axial line A is 0 to L1, and is compressed when the deformation in the direction of the axial line A is L1 to L1+L2. Once the deformation reaches L1+L2, the elastic member 30 buckles. On the other hand, as represented by the curve 101, the elastic member for comparison is compressed in the direction of the axial line A from an early stage of deformation, and buckles once the deformation in the direction of the axial line A reaches L2. In other words, the elastic member 30 of the illustrated embodiment is capable of absorbing more energy than the elastic member for comparison by an amount represented by the hatched area in the drawing.

According to the shock absorbing device 1 of the illustrated embodiment, when the bending deformation of the elastic member 30 by the distance of L1 is completed, the stepped portion 19 is received in the enlarged diameter portion 41 and the outer circumferential surface of the elastic member 30 is covered by the enlarged diameter portion 41 (See FIG. 5C) so that the buckling of the elastic member 30 caused by the radially outward bulging of the material thereof can be controlled. Also, because the space occupancy ratio of the elastic member 30 of the illustrated embodiment is smaller than that of the elastic member not provided with the outer circumferential grooves 31 and the inner circumferential grooves 32, radially outward bulging of the material of the elastic member 30 can be minimized. Therefore, the space needed between the inner circumferential surface of the enlarged diameter portion 41 and the outer circumferential surface 30A of the elastic member 30 can be minimized.

Because the outer circumferential grooves 31 and the inner circumferential grooves 32 alternate with each other in the direction of the axial line A, the directions of the localized bending deformation of the elastic member 30 cancel each other so that the elastic member 30 is allowed to extend substantially in the direction of the axial line A even when the elastic member 30 is caused to undergo a bending deformation by the distance of L2.

Figure 7:
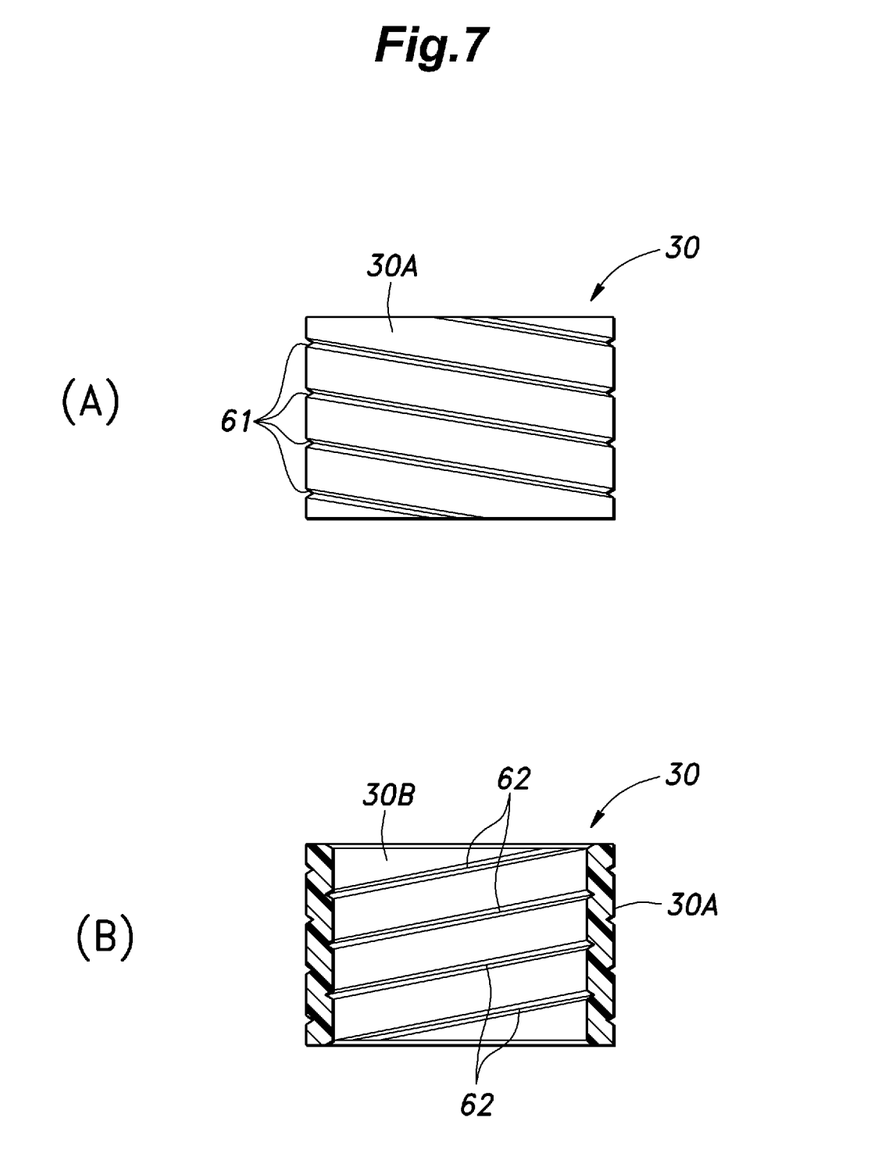
FIG. 7 is a sectional view showing a modified embodiment of the elastic member of the shock absorbing device according to the present invention.

Although the present invention has been described in terms of a preferred embodiment thereof, it is obvious to a person skilled in the art that various alterations and modifications are possible without departing from the scope of the present invention. For instance, the outer circumferential grooves 31 and the inner circumferential grooves 32 of the elastic member 30 can be formed as spiral grooves around the axial line B as shown in FIG. 7. According to this arrangement, when injection molding the elastic member 30 formed with the outer circumferential grooves 31 and the inner circumferential grooves 32, the removal of the molded elastic member 30 from the molding die is facilitated. The stepped portion 19 and the stopper portion 20 were formed in the ball joint housing 16 in the foregoing embodiment, but, alternatively, may also be formed in the end of the rack shaft 11 by appropriately working the relevant part. It is also possible to omit the stepped portion 19 so that the end surface of the elastic member 30 is directly engaged by the stopper portion 20.

GLOSSARY

| | | | |
|---|---|---|---|
| 1 | shock absorbing device | | |
| 10 | rack and pinion type steering device | | |
| 11 | rack shaft | 12 | rack housing |
| 15 | ball joint | 16 | ball joint housing |
| 19 | stepped portion (first pressing part) | | |
| 20 | stopper portion | 30 | elastic member |
| 30A | outer circumferential surface | 30B | inner circumferential surface |
| 31, 61 | outer peripheral groove | 32, 62 | inner peripheral groove |
| 40 | stopper engaging portion | 41 | large diameter portion |
| 42 | shoulder portion (second pressing part) | | |
| A | axial direction of the rack shaft | | |
| B | axial direction of the elastic member | | |

The invention claimed is:

1. A shock absorbing device for a rack and pinion steering device, comprising:
    a rack shaft for the rack and pinion steering device;
    a rack housing supporting the rack shaft so as to be moveable in an axial direction thereof, the rack housing including a tubular member receiving the rack shaft therein such that a space is defined between an inner circumferential surface of the tubular member and an outer circumferential surface of the rack shaft, the tubular member having an open end from which an axial end of the rack shaft extends;
    a stopper portion formed in an end part of the rack shaft;
    a stopper engaging portion provided on the rack housing to define a stroke end position for the rack shaft by engaging the stopper portion;
    a first pressing part formed on the rack shaft adjacent to the axial end of the rack shaft;
    a second pressing part formed on the inner circumferential surface of the tubular member at a prescribed distance from the open end of the tubular member; and
    a cylindrical elastic member fitted on the rack shaft and having an axial length greater than the prescribed distance such that the elastic member is pressed in the axial direction of the rack shaft by the first pressing part and the second pressing part as the stopper portion approaches the stopper engaging portion;
    wherein the elastic member is formed with a groove on each of an outer circumferential surface and an inner circumferential surface thereof, the groove on the outer circumferential surface being located at an axially different position from the groove on the inner circumferential surface.

2. The shock absorbing device according to claim 1, wherein the elastic member is formed with a plurality of grooves on each of an outer circumferential surface and an inner circumferential surface thereof such that the grooves on the outer and inner circumferential surfaces alternate each other along an axial direction of the elastic member.

3. The shock absorbing device according to claim 1, wherein the grooves extend spirally and continuously around an axial line of the elastic member.

4. The shock absorbing device according to claim 1, wherein an enlarged diameter portion is formed on the inner circumferential surface of the tubular member at the open end thereof, the elastic member being positioned within the enlarged diameter portion when the stopper approaches the stopper engaging portion, and wherein the second pressing part is formed as a shoulder portion defined at an axial end of the enlarged diameter portion away from the open end of the tubular member.

5. The shock absorbing device according to claim 1, wherein the first pressing part includes a stepped portion formed around the outer circumference of the rack shaft so as to protrude radially outward, the stepped portion having a diameter smaller than a diameter of the inner circumferential surface of the tubular member of the rack housing, such that the stepped portion is received in the space defined between the inner circumferential surface of the tubular member and the outer circumferential surface of the rack shaft before the stopper portion is engaged by the stopper engaging portion.

6. The shock absorbing device according to claim 5, wherein, when the grooves on the outer and inner circumferential surfaces of the elastic member are filled with material of the elastic member as a result of pressing of the elastic member by the stepped portion of the first pressing part and the second pressing part, an entirety of the elastic member is received in the space defined between the inner circumferential surface of the tubular member and the outer circumferential surface of the rack shaft.

* * * * *